United States Patent
Kanamitsu et al.

(10) Patent No.: US 10,205,839 B2
(45) Date of Patent: Feb. 12, 2019

(54) IMAGE READING APPARATUS AND IMAGE READING METHOD

(71) Applicant: SEIKO EPSON CORPORATION, Tokyo (JP)

(72) Inventors: Masatomo Kanamitsu, Fukuoka (JP); Kenichi Murahashi, Fukuoka (JP); Wataru Beppu, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/631,407

(22) Filed: Jun. 23, 2017

(65) Prior Publication Data

US 2017/0374216 A1 Dec. 28, 2017

(30) Foreign Application Priority Data

Jun. 28, 2016 (JP) ................................. 2016-127605

(51) Int. Cl.
  *H04N 1/04* (2006.01)
  *H04N 1/00* (2006.01)
  *B65H 29/12* (2006.01)
  *G03G 15/00* (2006.01)
  *G06T 3/40* (2006.01)
  *B65H 5/06* (2006.01)

(52) U.S. Cl.
  CPC ......... *H04N 1/00708* (2013.01); *B65H 5/062* (2013.01); *B65H 29/125* (2013.01); *G03G 15/6529* (2013.01); *G06T 3/40* (2013.01); *H04N 1/0057* (2013.01); *H04N 1/00095* (2013.01); *H04N 1/00795* (2013.01)

(58) Field of Classification Search
  CPC .......... H04N 2201/04712; H04N 2201/04744; H04N 2201/04749; H04N 1/047; H04N 1/053; H04N 1/1135; H04N 1/12; H04N 1/203; H04N 1/2034; H04N 2201/0426; H04N 1/00588; H04N 1/00602; H04N 1/00702; H04N 1/04; B65H 2301/438; B65H 2301/5132; B65H 2301/5322; B65H 2404/1442; B65H 2801/06; B65H 2801/27; B65H 29/125; B65H 5/004; B65H 9/101; B65H 5/062; B65H 7/14
  USPC ............ 355/26, 23, 24, 40, 53, 67; 358/496; 399/318, 320, 324, 328, 333, 407, 92
  See application file for complete search history.

(56) References Cited

U.S. PATENT DOCUMENTS

| | | | |
|---|---|---|---|
| 8,246,161 B2* | 8/2012 | Sootome | B41J 3/28 347/104 |
| 8,469,347 B2* | 6/2013 | Hata | B26D 5/02 270/58.07 |
| 2005/0062794 A1* | 3/2005 | Kanamitsu | B41J 2/16523 347/31 |

(Continued)

FOREIGN PATENT DOCUMENTS

| CN | 105376460 A | 3/2016 |
|---|---|---|
| JP | 2005-260387 A | 9/2005 |

*Primary Examiner* — Negussie Worku (57) ABSTRACT

In a case in which a carrier sheet including transparent sheet portions of two pieces which can interpose a document therebetween, and a bonding portion which bonds sheet portions to each other is transported in a state in which the bonding portion is located on the downstream side in the transport direction, a reading unit is caused to start reading, after an upstream end of the bonding portion passed through the reading unit.

6 Claims, 6 Drawing Sheets

(56) References Cited

U.S. PATENT DOCUMENTS

| | | | |
|---|---|---|---|
| 2007/0127087 A1* | 6/2007 | Nabemoto | H04N 1/00358 358/468 |
| 2015/0281488 A1* | 10/2015 | Kawauchi | H04N 1/0057 358/1.13 |
| 2016/0048358 A1 | 2/2016 | Ono | |
| 2017/0094086 A1* | 3/2017 | Nomoto | H04N 1/00588 |
| 2017/0107068 A1* | 4/2017 | Kanamitsu | H04N 1/00628 |
| 2017/0111524 A1* | 4/2017 | Tajima | H04N 1/00013 |
| 2017/0126911 A1* | 5/2017 | Kogi | H04N 1/0035 |
| 2017/0344819 A1* | 11/2017 | Murahashi | G06K 7/10 |
| 2017/0374214 A1* | 12/2017 | Kanamitsu | H04N 1/00602 |

* cited by examiner

IMAGE READING APPARATUS AND IMAGE READING METHOD

BACKGROUND

1. Technical Field

The present invention relates to an image reading apparatus such as a scanner which reads an image of a document, and an image reading method.

2. Related Art

In the related art, an image reading apparatus provided with a feeding roller (transport unit) which transports a document, and a line sensor (reading unit) which reads an image of the transported document is known (for example, JP-A-2005-260387).

Such an image reading apparatus are designed to read documents of certain sizes. For this reason, in order to read a document with a non-standard size, the document is folded twice and interposed between colorless and transparent carrier sheets, and the image of the document is read while the document is transported together with the carrier sheet.

The carrier sheet includes two transparent sheets (sheet portions) between which a document is interposed, and a bonding portion which bonds the sheets to each other. The bonding portion is located on the downstream side of the transparent sheets in a transport direction when the carrier sheet is being transported, and includes a combine instruction mark. That is, the image reading apparatus distinguishes a carrier sheet based on whether or not the combine instruction mark is included in an image that was read. For this reason, the combine instruction mark is included in the picked-up image data, and the size of image data becomes large.

SUMMARY

An advantage of some aspects of the invention is to provide an image reading apparatus and an image reading method in which it is possible to make the size of image data small.

According to an aspect of the invention, there is provided an image reading apparatus which includes a transport unit which transports a reading target, a reading unit which reads an image of the reading target which is transported by the transport unit, and a control unit which controls the reading unit, in which the reading target includes a carrier sheet which includes transparent sheet portions of two pieces which can interpose a document therebetween, and a bonding portion which bonds the sheet portions to each other, and the control unit causes the reading unit to start reading after an upstream end of the bonding portion passed through the reading unit, in a case in which the carrier sheet is transported in a state in which the bonding portion is located on a downstream side in a transport direction.

In a case in which an image of a document as a reading target is read not using the carrier sheet, the reading unit starts reading before a downstream end of a transported document passes through the reading unit. In addition, according to the configuration, in a case in which a reading target is a carrier sheet, the control unit causes the reading unit to delay a timing of starting reading as much as the bonding portion from a downstream end of the carrier sheet, and to start reading after an upstream end of the bonding portion passed through the reading unit. Accordingly, it is possible to make a size of image data small, since the reading unit does not read an image of the bonding portion.

It is preferable that the image reading apparatus further include a storage unit which stores gamma values for the document and gamma values for the carrier sheet, and the control unit cause the reading unit to read an image based on the gamma value for the document in a case in which the reading target is the document, and to read an image based on the gamma value for the carrier sheet in a case in which the reading target is the carrier sheet.

According to the configuration, the control unit changes gamma values when performing reading, depending on whether a reading target is a document or a carrier sheet. For this reason, it is possible to cause the reading unit to read an image using gamma values appropriate for a reading target.

In the image reading apparatus, it is preferable that the reading unit include a first reading unit which reads an image on a first surface of the reading target and a second reading unit which reads an image on a second surface of the reading target, a selecting unit which selects whether or not to execute combining processing in which a center-spread image is generated by combining a first image which is read by the first reading unit and a second image which is read by the second reading unit be further provided, and the control unit execute the combining processing according to a selection of the selecting unit in a case in which the reading target is the carrier sheet, and do not execute the combining processing in a case in which the reading target is the document.

A document with a size larger than a size which can be read is transported by being interposed in a carrier sheet in a folded state, and an image is read through the sheet portion. In addition, according to the configuration, combining processing is executed in a case in which a reading target is a carrier sheet, and combining processing is not executed in a case in which the reading target is a document. Accordingly, it is possible to obtain an image which is close to a document as a reading target.

In the image reading apparatus, it is preferable that the control unit detect the carrier sheet based on the number and a dimension of a portion to be detected which is provided in the carrier sheet.

According to the configuration, since the control unit detects the carrier sheet based on the number and the dimension of the portion to be detected, it is possible to improve a detecting accuracy of the carrier sheet compared to a case in which the carrier sheet is detected based on any one of the number and the dimension of the portion to be detected.

In the image reading apparatus, it is preferable that a light emitting unit which emits light, and a light receiving unit which receives the light which is emitted from the light emitting unit be further provided, the portion to be detected be a plurality of light transmitting portions through which the light is transmitted, the control unit detect the light transmitting portion when the light receiving unit receives the light transmitted through the light transmitting portion, and detect the carrier sheet based on at least any one of dimensions on upstream ends and dimensions on downstream ends of the plurality of light transmitting portions in the transport direction.

At a timing at which the upstream end and the downstream end of the light transmitting portion in the transport direction pass through the light receiving unit, intensity of light received by the light receiving unit gently changes. For this reason, it is not easy to specify a position of the upstream end and the downstream end of the light transmitting portion, and an error becomes large in a case in which a dimension from the upstream end to the downstream end is measured. In this point, according to the configuration, a carrier sheet is detected based on at least any one of the dimensions in the upstream ends and the dimensions in the downstream ends of the plurality of light transmitting portions. That is, since intensity of received light changes in the same manner in the upstream ends and the downstream ends, it is possible to obtain a dimension with a small error, by measuring dimensions of positions at which intensity of received light of approximately the same is detected, for example. Accordingly, it is possible to improve a detecting accuracy of a carrier sheet.

According to another aspect of the invention, there is provided an image reading method in an image reading apparatus which includes a transport unit which transports a reading target, and a reading unit which reads an image of the reading target which is transported by the transport unit, in which the reading target includes a carrier sheet which includes transparent sheet portions of two pieces which can interpose a document therebetween, and a bonding portion which bonds the sheet portions to each other, and the method includes transporting the carrier sheet in a state in which the bonding portion is located on a downstream side in a transport direction, and starting reading in which the reading unit is caused to start reading after an upstream end of the bonding portion passed through the reading unit.

According to the configuration, the same effect as that in the image reading apparatus can be exhibited.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, one embodiment of an image reading apparatus will be described with reference to drawings. The image reading apparatus in the embodiment is a sheet-fed scanner in which a fixed reading unit reads an image of a document which is transported, for example.

Figure 1:
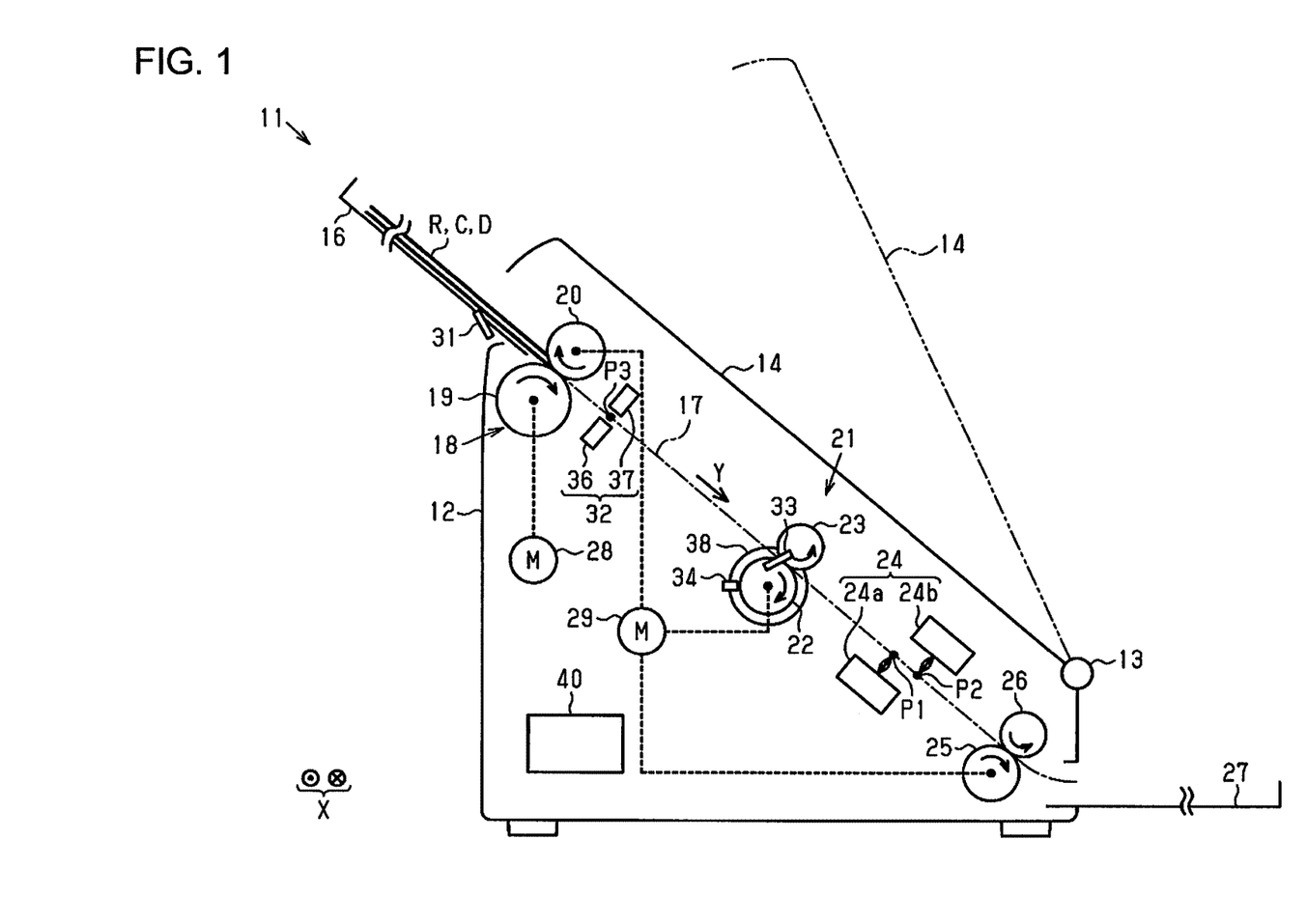
FIG. 1 is a schematic diagram which illustrates one embodiment of an image reading apparatus.

As illustrated in FIG. 1, an image reading apparatus 11 is provided with a main body unit 12 which is formed in an approximately trapezoidal box shape when viewed from a side, and a pivoting unit 14 which can pivot around a shaft 13 which is provided in the main body unit 12. That is, the pivoting unit 14 pivots between a closed position denoted by a solid line in FIG. 1 and an open position denoted by a two-dot dashed line in FIG. 1.

The image reading apparatus 11 is further provided with a mounting unit 16 on which a plurality of reading targets R can be mounted in a stacked state, and a feeding unit 18 which feeds the reading target R from the mounting unit 16 toward a transport path 17 which is denoted by one-dot dashed line in FIG. 1. The feeding unit 18 includes a feeding roller 19 which feeds the reading target R, and a friction force imparting unit 20 which generates a friction force between the friction force imparting unit and the reading target R fed by the feeding roller 19. In addition, the friction force imparting unit 20 in the embodiment is a separating roller which separates reading targets R by rotating while in contact with the reading target R.

A transport unit 21 which transports the reading target R fed by the feeding unit 18 from an upstream side to a downstream side in a transport direction Y is provided at a position on the downstream side of the feeding unit 18 in the transport direction Y. The transport unit 21 includes a transport roller 22 which transports the reading target R, and a transport driven roller 23 which is driven to rotate by the rotation of the transport roller 22. The transport roller 22 and the transport driven roller 23 are provided in such a manner that a transport path 17 is interposed therebetween.

A reading unit 24 for reading an image of the reading target R transported by the transport unit 21 is provided at a position on the downstream side of the transport unit 21 with respect to the transport direction Y, and extends in a main scanning direction (width direction X) to both sides of the transport path 17. The reading unit 24 includes a first reading unit 24a which reads an image on a first surface (for example, front surface) of the reading target R and a second reading unit 24b which reads an image on a second surface (for example, rear surface) of the reading target R.

That is, the first reading unit 24a is a line sensor provided in the main body unit 12, and continuously reads linear images at a first reading position P1, which linearly extends along the width direction X. In addition, the second reading unit 24b is a line sensor provided in the pivoting unit 14, and continuously reads linear images at a second reading position P2, which linearly extends along the width direction X. In addition, the linear image data read while the reading target R passes is concatenated into a first image of the first surface and a second image of the second surface of the reading target R. Note that the first reading unit 24a and the second reading unit 24b are provided in such a manner that positions of the first reading position P1 and the second reading position P2 are different in the transport direction Y.

A discharging roller 25 which discharges the reading target R from the main body unit 12, a discharging driven roller 26 which rotates in a driven manner along with the rotation of the discharging roller 25, and a discharge unit 27 to which the reading target R is discharged are provided on the downstream side of the reading unit 24 in the transport direction Y.

In addition, the image reading apparatus 11 is provided with a feeding motor 28 that serves as a driving source for rotating the feeding roller 19, and a transport motor 29 that serves as a driving source for rotating the transport roller 22. The transport motor 29 is also connected to the friction force imparting unit 20 and the discharging roller 25, and also rotates the friction force imparting unit 20 and the discharging roller 25.

The feeding roller 19, the transport roller 22, and the discharging roller 25 perform forward rotation along with driving of the feeding motor 28 and the transport motor 29 so as to transport the reading target R from the upstream side to the downstream side in the transport direction Y. In addition, the friction force imparting unit 20 performs reverse rotation along with driving of the transport motor 29 so as to impart a friction force to the reading target R in a direction opposite to the transport direction Y.

The image reading apparatus 11 is further provided with a mounting detecting unit 31 which can detect the reading target R mounted on the mounting unit 16, and a feeding detecting unit 32 which can detect the fed reading target R. The image reading apparatus 11 is further provided with a transport detecting unit 33 which can detect the reading target R which is transported, and a rotation detecting unit 34 which detects rotation of the transport roller 22. The transport detecting unit 33 is provided at appropriately the same position as the transport roller 22 in the transport direction Y.

The mounting detecting unit 31 and the transport detecting unit 33 are contact-type sensors which include a lever, for example, and detect presence or absence of the reading target R when the lever is pressed by the reading target R. The feeding detecting unit 32 is an optical sensor which includes a light emitting unit 36, which emits light, and a light receiving unit 37 that receives light emitted from the light emitting unit 36. The light emitting unit 36 and the light receiving unit 37 are disposed at positions facing each other with the transport path 17 interposed therebetween. That is, the light emitting unit 36 radiates light toward a detecting position P3 on the transport path 17, and the light receiving unit 37 receives light that passes through the detecting position P3.

The rotation detecting unit 34 is a rotary encoder, for example, and detects gradations of an encoder scale 38, which rotates along with the transport roller 22. The image reading apparatus 11 further includes a control unit 40 which integrally controls driving of mechanisms in the image reading apparatus 11 such as the reading unit 24.

Next, the reading target R will be described.

Figure 2:
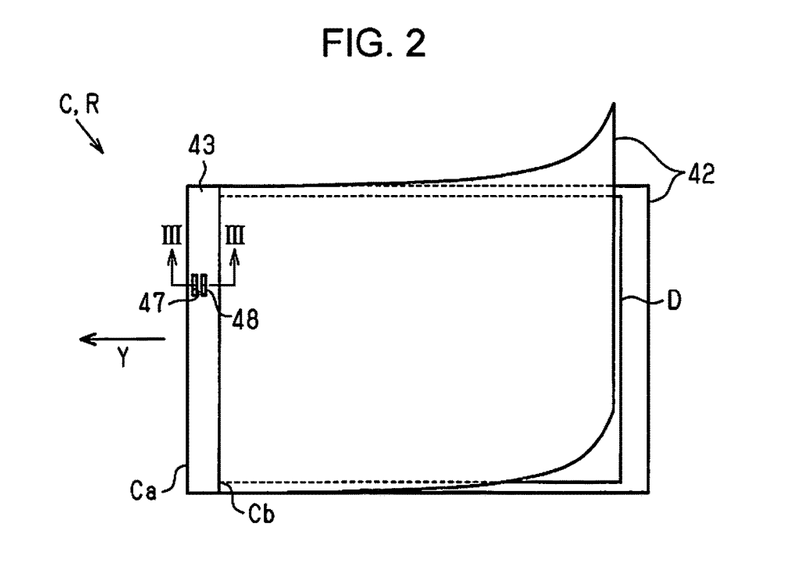
FIG. 2 is a schematic diagram of a carrier sheet which interposes a document between sheet portions.

As illustrated in FIG. 2, the reading target R can include a carrier sheet C. The carrier sheet C has two transparent sheet portions 42 which can interpose a document D therebetween, and a bonding portion 43 that bonds the sheet portions 42 together. The document D by itself can be considered the reading target R, and includes a card such as a post card, a name card, a driver's license, or an insurance card, a sheet such as manuscript paper or copier paper, a book type object such as a passport or pamphlet, and pouches such as an envelope, a paper bag. That is, the reading target R can include the document D and the carrier sheet C in which the document D is interposed.

The reading target R mounted on the mounting unit 16 is fed by being separated sheet by sheet by the feeding unit 18. For this reason, a document D such as a notebook or a folded sheet, can have its overlapped portions shifted out of position by friction force imparted by the friction force imparting unit 20, resulting in a transport failure, or failure to obtain a desired image. Therefore, such a document D that is difficult to read on its own can be transported together with the carrier sheets C, that is, interposed between the carrier sheets C, and its image read through the sheet portion 42. In addition, also in a case of a document D such as thin paper or a picture, it is possible to reduce a concern of damaging the document D by using the carrier sheet C.

Figure 3:
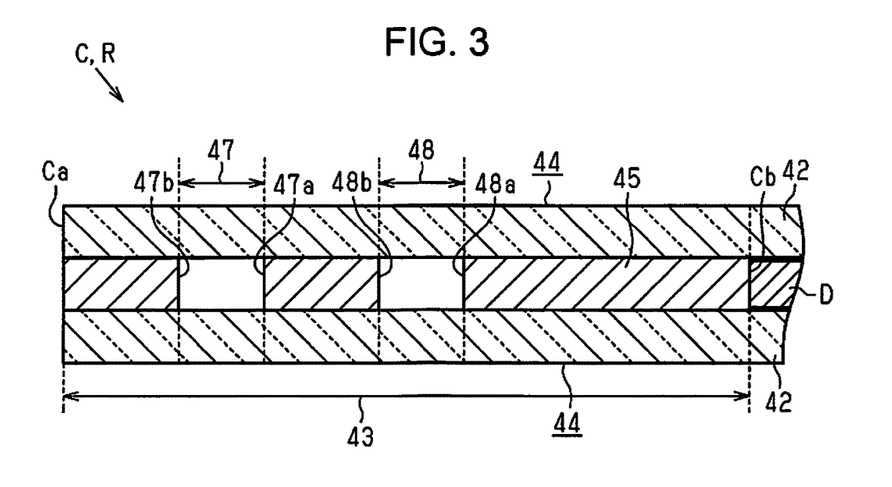
FIG. 3 is a sectional view which is taken along line III-III in FIG. 2.

As illustrated in FIGS. 2 and 3, the carrier sheet C is formed by bonding together two square-shaped sheets 44 using an opaque bonding material 45. The two square-shaped sheets 44 are formed of a synthetic resin, which is colorless and transparent. In addition, a bonded belt-shaped portion is considered as the bonding portion 43, and the portion extending from the bonding portion 43 is considered as the sheet portion 42.

A plurality (two in the embodiment) of light transmitting portions through which light is transmitted, that is, a first light transmitting portion 47 and a second light transmitting portion 48, are provided in the bonding portion 43. The first and second light transmitting portions are examples of a portion to be detected. The first light transmitting portion 47 and the second light transmitting portion 48 are formed at positions through which the light transmitting portions 47, 48 will pass through the detecting position P3 of the feeding detecting unit 32, when the carrier sheet C is fed into the image reading apparatus 11 in the orientation of its intended use, that is, with the bonding portion 43 located on the downstream side in the transport direction Y.

That is, the carrier sheet C is transported with the bonding portion 43 located on the downstream side in the transport direction Y. The two ends of the first light transmitting portion 47 in the transport direction Y are designated as a first upstream end 47a and a first downstream end 47b. The first upstream end 47a is to the side of the first light transmitting portion 47 that is farther (i.e., separated from) a tip end Ca of the carrier sheet C. The tip end Ca is at the downstream end of the carrier sheet C when the carrier sheet C is transported in the transport direction. On the other hand, the first downstream end 47b is closer to the tip end Ca than is the first upstream end 47a. Similarly, the two ends of the second light transmitting portion 48 in the transport direction Y are a second upstream end 48a and a second downstream end 48b.

Next, electrical configuration of the image reading apparatus 11 will be described.

Figure 4:
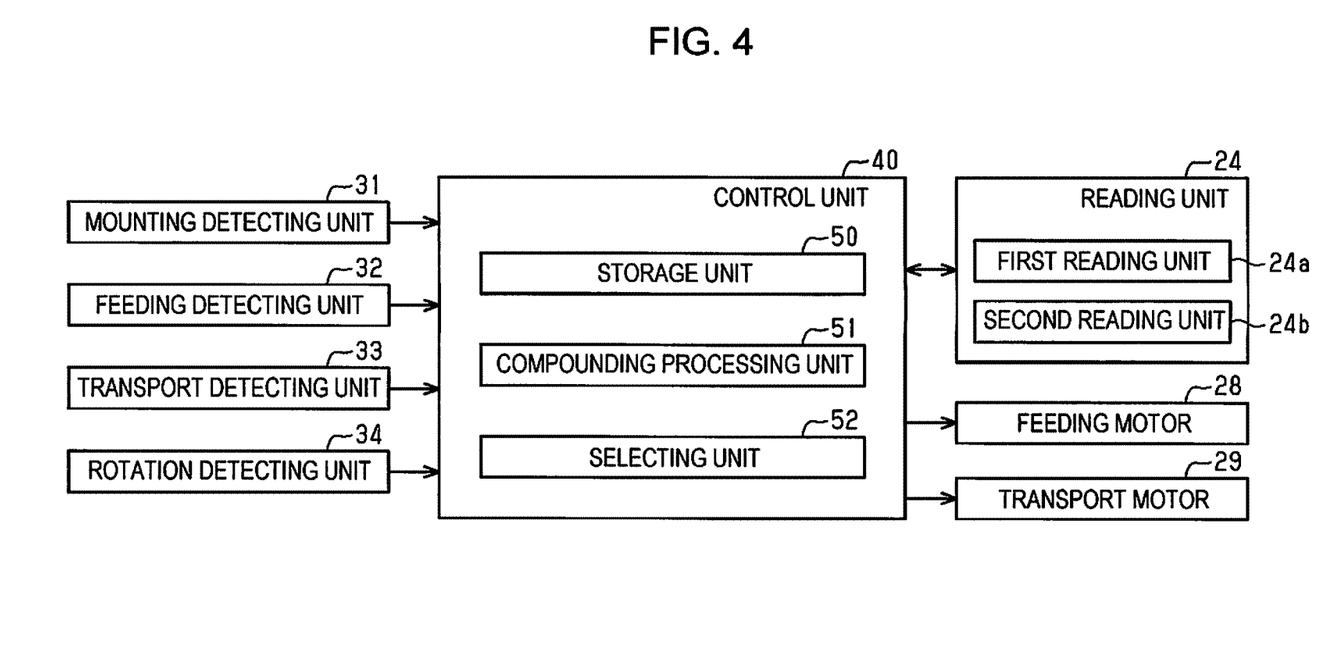
FIG. 4 is a block diagram of a control unit.

As illustrated in FIG. 4, the control unit 40 is provided with a storage unit 50 which stores gamma values for the document D, and gamma values for the carrier sheet C. The control unit 40 is further provided with a combining processing unit 51 and a selecting unit 52. The combining processing unit 51 generates a center-spread image by combining a first image read by the first reading unit 24a and a second image read by the second reading unit 24b. The selecting unit 52 is for selecting whether or not to execute combining processes. Note that the selecting unit 52 selects whether or not to execute the combining processing based on reading conditions which are input along with a job from a host device, for example.

The control unit 40 controls driving of the reading unit 24, the feeding motor 28, and the transport motor 29, based on detection results from the mounting detecting unit 31, the feeding detecting unit 32, the transport detecting unit 33, and the rotation detecting unit 34.

Next, a description will be provided for a method for distinguishing, based on a detection result of the feeding detecting unit 32, whether the reading target R is the carrier sheet C or the document D.

Figure 5:
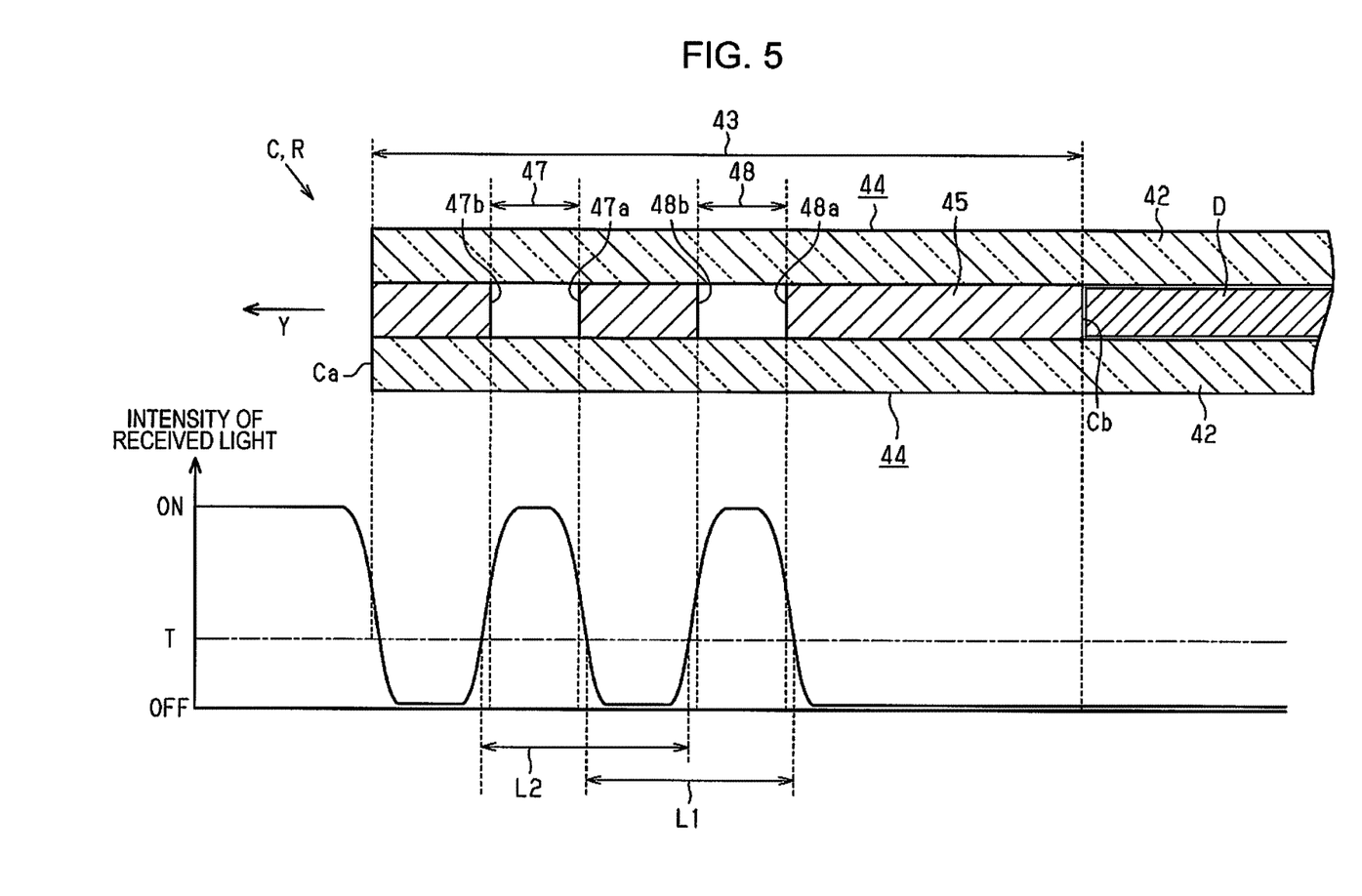
FIG. 5 is a schematic sectional view of a carrier sheet, and a graph which illustrates intensity of received light of a light receiving unit.

As illustrated in FIG. 5, the feeding detecting unit 32 detects presence or absence of the reading target R, and outputs ON or OFF, in accordance with the intensity of light received by the light receiving unit 37. Specifically, the feeding detecting unit 32 outputs ON when the intensity of received light is larger than a threshold value T, and outputs OFF when light is blocked off by the reading target R, so that the intensity of received light becomes smaller than the threshold value T.

The control unit 40 detects the carrier sheet C based on the number and dimension of the light transmitting portions (i.e., the first light transmitting portion 47 and the second light transmitting portion 48) provided in the carrier sheet C. That is, the feeding detecting unit 32 outputs ON before the carrier sheet C is fed, and is switches to OFF at the timing when the tip end Ca of the carrier sheet C passes through the detecting position P3. In addition, the output of the feeding detecting unit 32 changes to ON at a timing when the first downstream end 47b of the first light transmitting portion 47 passes through the detecting position P3, and changes to OFF at a timing when the first upstream end 47a passes through the detecting position P3. When the second light transmitting portion 48 passes through the detecting position P3, the ON and OFF switch is similar to when the first light transmitting portion 47 passes through the detecting position P3.

The two light transmitting portions (i.e., the first light transmitting portion 47 and the second light transmitting portion 48) are formed in the carrier sheet C in the embodiment. For this reason, the feeding detecting unit 32 outputs ON twice before the bonding portion 43 passes completely through the detecting position P3. Note that because the output from the feeding detecting unit 32 switches at a timing that varies in accordance with the threshold value T, the timing when the carrier sheet C actually passes through the detecting position P3 can deviate from the timing when the feeding detecting unit 32 detects passing of the carrier sheet C.

Therefore, the control unit 40 also obtains, based on the detection results from the feeding detecting unit 32, a detected upstream end dimension L1, which is the dimension from the first upstream end 47a to the second upstream end 48a. That is, the control unit 40 obtains, as the detected upstream end dimension L1, the dimension from the position where intensity of received light drops below the threshold value T when the first upstream end 47a passes through the detecting position P3, to the position where intensity of received light drops below the threshold value T when the second upstream end 48a passes through the detecting position P3.

In addition, the control unit 40 obtains, based on a detection result of the feeding detecting unit 32, a detected downstream end dimension L2, which is the dimension from the first downstream end 47b to the second downstream end 48b. That is, the control unit 40 obtains, as the detected downstream end dimension L2, the dimension from a position where intensity of received light exceeds the threshold value T when the first downstream end 47b passes through the detecting position P3, to the position where intensity of received light exceeds the threshold value T when the second downstream end 48b passes through the detecting position P3.

The control unit 40 determines that the reading target R is the carrier sheet C if a set upstream end dimension stored in the storage unit 50 matches the detected upstream end dimension L1, and also a set downstream end dimension stored in the storage unit 50 matches the detected downstream end dimension L2. In other words, the control unit 40 detects the first light transmitting portion 47 and the second light transmitting portion 48 when the light receiving unit 37 receives light transmitted through the first light transmitting portion 47 and the second light transmitting portion 48. In addition, the control unit 40 detects the carrier sheet C based on the dimension between the upstream ends (i.e., the first upstream end 47a and the second upstream end 48a) and the dimensions between the downstream ends (i.e., the first downstream end 47b and the second downstream end 48b) of the plurality of light transmitting portions with respect to the transport direction Y.

The set upstream end dimension and the set downstream end dimension are dimensions set according to position and size of the light transmitting portions (i.e., the first light transmitting portion 47 and second light transmitting portion 48) of the carrier sheet C, and are set to a value that takes a certain amount of error (for example, ±0.2 mm) into account.

If the detected upstream end dimension L1 does not match the set upstream end dimension, or the detected downstream end dimension L2 does not match the set downstream end dimension, that is, if there is at least one mismatch, then the control unit 40 determines that the reading target R is the document D. In addition, the control unit 40 also determines that the reading target R is the document D if the feeding detecting unit 32 does not output ON between when the transport detecting unit 33 detects the tip end of the reading target R to when the feeding detecting unit 32 detects the tip end of the reading target R, if the ON signal is output only once, or if the ON signal is output three times or more.

Next, an image reading method of the image reading apparatus 11 will be described based on an image reading process routine while referring to the flowchart in FIG. 6. The image reading process routine is executed when the reading target R is placed on the mounting unit 16 and an image reading job is input. If the reading target R is the carrier sheet C, the carrier sheet C is mounted so that the bonding portion 43 is located on the downstream side in the transport direction Y.

Figure 6:
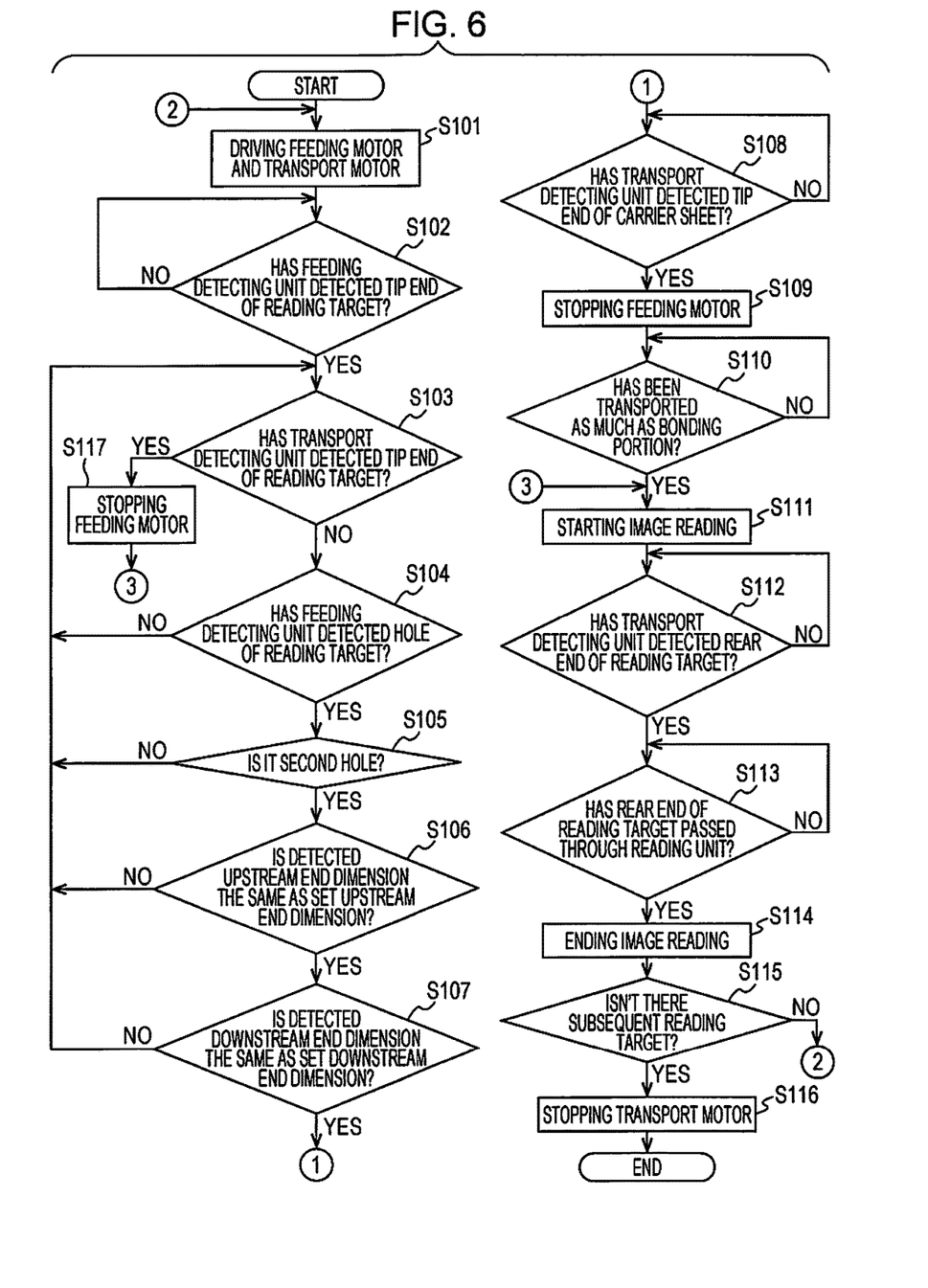
FIG. 6 is a flowchart of a routine of image reading processing.

As illustrated in FIG. 6, the control unit 40 drives the feeding motor 28 and the transport motor 29 in step S101, and the reading target R is fed into the feeding unit 18. In addition, in step S102, the control unit 40 determines whether or not the feeding detecting unit 32 detected a tip end Ca of the reading target R (i.e., the downstream end in transport direction Y).

If the feeding detecting unit 32 has not detected the reading target R (No in step S102), the control unit 40 waits until the feeding detecting unit 32 detects the reading target R. When the feeding detecting unit 32 detects the reading target R, the control unit 40 determines that the feeding detecting unit 32 detected the tip end Ca of the reading target R (Yes in step S102), and then in step S103 determines whether or not the transport detecting unit 33 detected the tip end Ca of the reading target R. If the transport detecting unit 33 has not detected the reading target R (No in step S103), the control unit 40 determines that the reading target R has not yet been transported to the transport detecting unit 33, and so proceeds to step S104.

In step S104, the control unit 40 determines whether or not the feeding detecting unit 32 detected holes in the reading target R. That is, sometimes punch holes are formed in the document D in order to bind documents D together. When the holes pass through the detecting position P3, an output of the feeding detecting unit 32 will temporarily switch to ON in the same manner as when the first light transmitting portion 47 or the second light transmitting portion 48 of the carrier sheet C pass through the detecting position P3.

That is, if OFF is continuously output from the feeding detecting unit 32, the control unit 40 determines that the feeding detecting unit 32 has not detected any holes in the reading target R (No in step S104), and proceeds to step S103. On the other hand, when ON is temporarily output from the feeding detecting unit 32, the control unit 40 determines that the feeding detecting unit 32 has detected a hole in the reading target R (Yes in step S104), and so proceeds to step S105.

In step S105, the control unit 40 determines whether or not the detected hole is a second hole, and if not the second hole (No in step S105), proceeds to step S103. If it is the second hole (Yes in step S105), then the control unit 40 proceeds to step S106.

In step S106, the control unit 40 compares the detected upstream end dimension L1, which is the dimension between the upstream ends of the two detected holes, with the preset upstream end dimension (which is preset). In addition, in step S107, the control unit 40 compares the detected downstream end dimension L2, which is the dimension between the downstream ends of the two detected holes, with the set downstream end dimension (which is preset).

If at least one of either the detected upstream end dimension L1 differs from the set upstream end dimension, or the detected downstream end dimension L2 differs from the set downstream end dimension (No in step S106, or No in step S107), then the control unit 40 proceeds to step S103. If both the detected upstream end dimension L1 is the same as the set upstream end dimension, and the detected downstream end dimension L2 is the same as the set downstream end dimension (Yes in step S106, Yes in step S107), then the control unit 40 determines that the reading target R is the carrier sheet C, and proceeds to step S108.

In step S108, the control unit 40 determines whether or not the transport detecting unit 33 detected the tip end Ca of the carrier sheet C. If the transport detecting unit 33 has not detected the carrier sheet C (No in step S108), the control unit 40 waits until the transport detecting unit 33 detects the carrier sheet C. When the transport detecting unit 33 detects the carrier sheet C, the control unit 40 determines that the transport detecting unit 33 has detected the tip end Ca of the carrier sheet C (Yes in step S108), and proceeds to step S109.

In step S109, the control unit 40 stops driving the feeding motor 28. Since the transport motor 29 is being driven at this time, the carrier sheet C will be transported by the transport unit 21. That is, when the reading target R is the carrier sheet C, the control unit 40 transports the carrier sheet C with the bonding portion 43 located on the downstream side in the transport direction Y (transporting step). In addition, in step S110, the control unit 40 determines whether or not the carrier sheet C has been transported as much as the bonding portion 43 (or, said differently, by a distance equivalent to the bonding portion 43).

That is, when, based on detection results from the rotation detecting unit 34, the transport roller 22 has not rotated by a predetermined first number of rotations after the transport detecting unit 33 detects the tip end Ca of the carrier sheet C, then the control unit 40 determines that the carrier sheet has not been transported by as much as the bonding portion (No in step S110). Note that the predetermined first number of rotations is the number of rotations necessary for transporting an upstream end Cb (refer to FIG. 5) of the bonding portion 43 to the reading unit 24 (i.e., to the first reading position P1 and the second reading position P2) after the transport detecting unit 33 detects the tip end Ca of the carrier sheet C.

When the transport roller 22 rotates by the predetermined first number of rotation after the transport detecting unit 33 detects the tip end Ca of the carrier sheet C, the control unit 40 determines that the reading target R has been transported as much as the bonding portion 43 (Yes in step S110). Then, in step S111, the control unit 40 causes the reading unit 24 to start reading (step of starting reading). That is, the control unit 40 causes the reading unit 24 to start reading after the upstream end Cb of the bonding portion 43 has passed through the reading unit 24.

In step S112, the control unit 40 determines whether or not the transport detecting unit 33 detected the rear end (i.e., the upstream end in transport direction Y) of the reading target R. That is, when the transport detecting unit 33 detects the reading target R (No in step S112), the control unit 40 waits until the transport detecting unit 33 no longer detects the reading target R. When the transport detecting unit 33 no longer detects the reading target R, the control unit 40 determines that the transport detecting unit 33 has detected the rear end of the reading target R (Yes in step S112).

In step S113, the control unit 40 determines whether or not the rear end of the reading target R has passed through the reading unit 24. That is, the control unit 40 determines that the rear end has not yet passed through the reading unit 24, and so waits, when the number of times that the transport roller 22 rotates after the transport detecting unit 33 detected the rear end of the reading target R, is smaller than a predetermined second number of rotations (No in step S113). Note that the predetermined second number of rotations is the number of rotations necessary after the transport detecting unit 33 detects the rear end of the reading target R, to transport the rear end of the reading target R to the reading unit 24.

In addition, when the number of times that the transport roller 22 rotates after the transport detecting unit 33 detected the rear end of the reading target R is the predetermined second number of rotations or more, then the control unit 40 determines that the rear end of the reading target R has passed through the reading unit 24 (Yes in step S113).

In step S114, the control unit 40 causes the reading unit 24 to end image reading. In step S115, the control unit 40 determines whether or not a subsequent reading target R is mounted on the mounting unit 16, based on a detection result of the mounting detecting unit 31. When a subsequent reading target R is mounted on the mounting unit 16 (No in step S115), then the process proceeds to step S101. When no reading target R is mounted on the mounting unit 16 (Yes in step S115), the control unit 40 stops drive of the transport motor 29 in step S116, and ends the image reading process routine.

In step S103, when the state of the transport detecting unit 33 switches from detecting the reading target R to not detecting the reading target R, the control unit 40 determines that the transport detecting unit 33 detected a tip end of a document D as a reading target R (Yes in step S103), and proceeds to step S117. In step S117, the control unit 40 stops the feeding motor 28, and proceeds to step S111.

Next, descriptions will be made based on an image combining process routine with reference to the flowchart in FIG. 7. The image combining process routine is executed at when the reading unit 24 ends reading.

Figure 7:
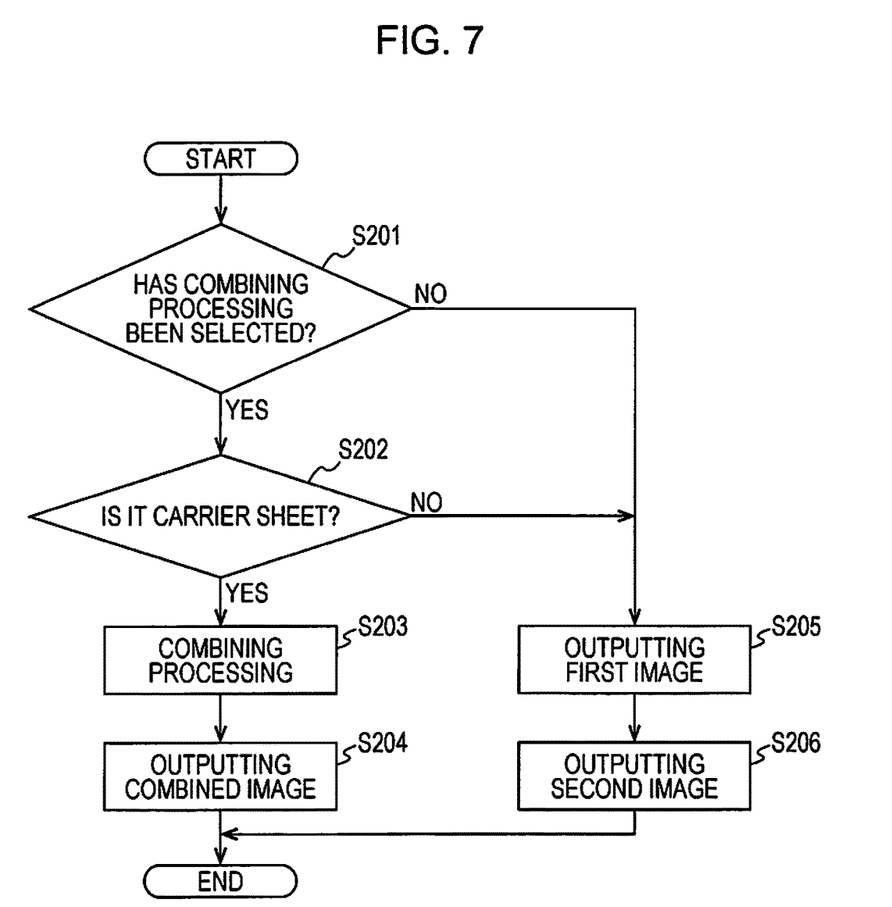
FIG. 7 is a flowchart of a routine of image combining processing.

As illustrated in FIG. 7, in step S201, the control unit 40 determines whether or not execution of the combining process is selected. If the combining process is selected (Yes in step S201), the control unit 40 determines whether or not the reading target R is the carrier sheet C in step S202.

When the reading target R is the carrier sheet C (Yes in step S202), the control unit 40 generates a center-spread image by executing the combining process in step S203, outputs the center-spread image in step S204, and ends the image combining process routine.

If in step S201 it is determined that the combining processing is not selected (No in step S201), or if in step S202 it is determined that the reading target R is a document D (No in step S202), then the control unit 40 proceeds to step S205.

In step S205, the control unit 40 outputs a first image read by the first reading unit 24a, and in step S206 outputs a second image read by the second reading unit 24b, and then ends the image combining process routine.

Next, operation of the image reading apparatus 11 will be described.

As illustrated in FIG. 1, when a job to read the image of a reading target R is input while a reading target R is mounted on the mounting unit 16, the control unit 40 drives the feeding motor 28 and the transport motor 29, to feed and transport the reading target R.

If the reading target R is a document D, then based on detection results of the transport detecting unit 33 and the rotation detecting unit 34, the control unit 40 causes the first reading unit 24a to start reading before a tip end of the document D (i.e., the downstream end in the transport direction Y) passes through the first reading position P1. In addition, the control unit 40 causes the second reading unit 24b to start reading before the tip end of the document D passes through the second reading position P2. Note that because the reading target R is a document D, the control unit 40 causes the reading unit 24 to read an image based on the gamma values for the document D.

The control unit 40 causes the first reading unit 24a to end reading after the rear end of the document D (upstream end in transport direction Y) passes through the first reading position P1, and causes the second reading unit 24b to end reading after the rear end of the document D passes through the second reading position P2.

When the reading target R is a document D, then the control unit 40 does not execute the combining process regardless of the selection at the selecting unit 52. Accordingly, the control unit 40 outputs the first image read by the first reading unit 24a, and the second image read by the second reading unit 24b to a host device, for example, even when execution of the combining process is selected at the selecting unit 52.

On the other hand, if the reading target R includes a carrier sheet C, the control unit 40 delays timing at which the reading unit 24 starts reading compared to when the reading target R is a document D only, and causes the reading unit 24 to start reading after the upstream end Cb of the bonding portion 43 passes through the reading unit 24. Specifically, based on detection results of the transport detecting unit 33 and the rotation detecting unit 34, the control unit 40 causes the first reading unit 24a to start reading after the upstream end Cb of the bonding portion 43 passes through the first reading position P1. The control unit 40 also causes the second reading unit 24b to start reading after the upstream end Cb of the bonding portion 43 passes through the second reading position P2. At this time, because the reading target R is a carrier sheet C, the control unit 40 causes the reading unit 24 to read an image based on the gamma values for the carrier sheet C.

The control unit 40 causes the first reading unit 24a to end reading after the rear end of the carrier sheet C (upstream end in transport direction Y) passes through the first reading position P1, and causes the second reading unit 24b to end reading after the rear end of the carrier sheet C passes through the second reading position P2. When the reading target R is the carrier sheet C, the control unit 40 executes combining processes according to the selection at the selecting unit 52. That is, when execution of the combining process is selected at the selecting unit 52, the combining processing unit 51 generates a center-spread image by combining the first image and the second image, and the control unit 40 outputs the center-spread image to, for example, a host device. In addition, when execution of the combining process is not selected at the selecting unit 52, the control unit 40 outputs the first image and the second image to, for example, a host device.

According to the above-described embodiment, it is possible to obtain the following effects.

(1) When the reading target R is a document D and its image is read without using a carrier sheet C, the reading unit 24 starts reading the images before the downstream end of the transported document D passes through the reading unit 24. In addition, when the reading target R includes a carrier sheet C, the control unit 40 delays start of the reading unit 24 from the tip end Ca of the carrier sheet C by a timing equivalent to the bonding portion 43, so that the reading unit starts reading after the upstream end Cb of the bonding portion 43 has passed through the reading unit 24. Accordingly, it is possible to reduce the size of image data since the reading unit 24 does not read the image of the bonding portion 43.

(2) The control unit 40 changes gamma values used for reading images depending on whether a reading target R is a document D or a carrier sheet C. For this reason, it is possible to read an image using gamma values suitable for the reading target R.

(3) A document D that is larger than the readable size of the image reading apparatus 11 is transported in a folded state and interposed in a carrier sheet C, and its image is read through the sheet portion 42. In addition, combining processes are executed when the reading target R is a carrier sheet C, and combining processes are not executed when a reading target R is a document D. Accordingly, it is possible to obtain an image closer to the document D which is a reading target.

(4) Since the control unit 40 detects a carrier sheet C based on the number and dimensions of light transmitting portions (i.e., the first light transmitting portion 47 and the second light transmitting portion 48), it is possible to improve detecting accuracy of the carrier sheet C compared to when the carrier sheet C is detected based on only one of either the number or dimension of the light transmitting portion.

(5) Intensity of light received by the light receiving unit 37 gently changes when the upstream end (i.e., the first upstream end 47a or the second upstream end 48a) and the downstream end (i.e., the first downstream end 47b or the second downstream end 48b) of the light transmitting portion pass through the detecting position P3 in the transport direction Y. For this reason, it is difficult to specify precise positions of the upstream or downstream ends of a light transmitting portion, so measurements of a dimension from the first upstream end 47a to the first downstream end 47b, for example, can include a large amount of error. To improve accuracy, the carrier sheet C is detected based on a detected upstream end dimension L1 of the upstream ends, and the detected downstream end dimension L2 of the downstream ends of a plurality of light transmitting portions. That is, since intensity of received light changes similarly at the upstream and downstream ends, a dimension with a small error can be obtained by, for example, measuring dimensions at the same positions where intensity of received light is detected at approximately the same degree. Accordingly, it is possible to improve a detecting accuracy of the carrier sheet C.

The above-described embodiment may be modified as follows.

In the above described embodiment, the friction force imparting unit 20 may be a separating pad which separates reading targets R by interposing the reading target R along with the feeding roller 19.

In the above-described embodiment, when the reading target R is the carrier sheet C, the control unit 40 may start the reading unit 24 to start reading at a point of time between when the upstream end Cb of the bonding portion 43 passes through the reading unit 24 and when the tip end of a document D interposed in the carrier sheet C is located in the reading unit 24.

In the above-described embodiment, the mounting detecting unit 31, the feeding detecting unit 32, the transport detecting unit 33, and the rotation detecting unit 34 may be optionally a contact type or a non-contact type detection unit. The first light transmitting portion 47 and the second light transmitting portion 48 can be optionally changed to any light transmitting portion detectable by a feeding detecting unit 32. For example, the feeding detecting unit 32 may be a contact-type sensor with a lever, capable of detecting a hole, a groove, a protrusion, and the like provided in the carrier sheet C as a portion to be detected. In addition, the feeding detecting unit 32 may be an image sensor, capable of detecting, using image processing, a mark provided in the carrier sheet C as a portion to be detected.

In the above-described embodiment, the control unit 40 may detect a carrier sheet C based on any one of the number and a dimension of the light transmitting portion. That is, the reading target R can be determined as a carrier sheet C if the feeding detecting unit 32 outputs ON twice between when the feeding detecting unit 32 detects a tip end of a reading target R and when the transport detecting unit 33 detects the tip end of the reading target R.

In the above-described embodiment, the control unit 40 may detect a carrier sheet C based on at least any one of dimensions of upstream ends (first upstream end 47a and second upstream end 48a) and dimensions of downstream ends (first downstream end 47b and second downstream end 48b) of the plurality of light transmitting portions in the transport direction Y. That is, the control unit 40 may determine that a reading target R is a carrier sheet C if either the set upstream end dimension does not match the detected upstream end dimension L1, or the set downstream end dimension does not match the detected downstream end dimension L2.

In the above-described embodiment, the first light transmitting portion 47 and the second light transmitting portion 48 may be holes. Also or in addition, the carrier sheet can be provided with three or more light transmitting portions.

In the above described embodiment, the reading unit 24 may include only one of the first reading unit 24a or the second reading unit 24b.

In the above-described embodiment, the image reading apparatus 11 need not be provided with the feeding detecting unit 32. For example, the control unit 40 may determine whether a reading target R is a carrier sheet C or a document D based on a job, or setting of a user.

In the above-described embodiment, the control unit 40 may not be provided with the combining processing unit 51. For example, combining processing may be performed in a host device. In addition, the selecting unit 52 may be set to a button or a touch panel which can be operated by a user, and whether or not to execute combining processing may be selected by an operation of the user.

In the above-described embodiment, the reading unit 24 may read a reading target R using the same gamma value, regardless of a type of a reading target R.

In the above-described embodiment, the image reading apparatus 11 is not limited to a sheet feeding type, and may be a flatbed type which is provided with an automatic sheet feeding device (automatic sheet feeder) which automatically feeds a reading target R. In addition, the image reading apparatus 11 may be applied to a multifunction peripheral which is configured integrally with a printing apparatus, a facsimile provided with a communication function, or the like.

The entire disclosure of Japanese Patent Application No. 2016-127605, filed Jun. 28, 2016 is expressly incorporated by reference herein.

What is claimed is:

1. An image reading apparatus for reading an image from a reading target that is a document by itself or a carrier sheet, the carrier sheet including two transparent sheet portions and a bonding portion that bonds the sheet portions to each other, the image reading apparatus comprising:
   a conveyer configured to transport the reading target in a transport direction, the conveyer being configured to transport the carrier sheet with the bonding portion at a downstream side with respect to the transport direction;
   a reader configured to read an image of the reading target transported by the conveyer;
   a detector configured to detect whether the reading target includes a carrier sheet; and
   a controller configured to control the reader to, when the detector detects that the reading target includes a carrier sheet, cause the reader to start reading after an upstream end of the bonding portion, with respect to the transport direction, has passed through the reader, with the upstream end of the bonding portion being spaced away from a downstream edge of the carrier sheet with respect to the transport direction.

2. The image reading apparatus according to claim 1, further comprising:
   a memory configured to store gamma values for the document and gamma values for the carrier sheet,
   wherein the detector determines whether the reading target is a document; and
   the controller causes the reader to read an image based on the gamma values for the document when the detector determines that the reading target is a document, and to read an image based on the gamma values for the carrier sheet when the detector determines that the reading target is the carrier sheet.

3. The image reading apparatus according to claim 1, wherein the reader includes:
   a first reader configured to read an image on a first surface of the reading target, and
   a second reader configured to read an image on a second surface of the reading target,
   the image reading apparatus further comprising a selector configured to select whether or not to execute a combining process in which a center-spread image is generated by combining the first image read by the first reader with the second image read by the second reader, and
   wherein the controller executes the combining processing according to a selection at the selector when the detector determines that the reading target is the carrier sheet, and does not execute the combining processing when the detector determines that the reading target is the document.

4. The image reading apparatus according to claim 1, wherein the detector determines that the reading target is the carrier sheet based on the number and a dimension of a portion to be detected of the carrier sheet.

5. An image reading apparatus for reading an image from a reading target that is a document by itself or a carrier sheet, the carrier sheet including two transparent sheet portions and a bonding portion that bonds the sheet portions to each other, the image reading apparatus comprising:
   a conveyer configured to transport the reading target in a transport direction, the conveyer being configured to transport the carrier sheet with the bonding portion at the downstream side with respect to the transport direction;
   a reader configured to read an image of the reading target transported by the conveyer;
   a detector configured to detect whether the reading target includes a carrier sheet; and
   a controller configured to control the reader to, when the detector detects that the reading target includes a carrier sheet, cause the reader to start reading after an upstream end of the bonding portion, with respect to the transport direction, has passed through the reader,
   wherein the detector determines that the reading target is the carrier sheet based on the number and a dimension of a portion to be detected of the carrier sheet,
   wherein the portion to be detected is a plurality of light transmitting portions through which the light is transmitted;
   the detector including:
      a light emitter configured to emit light; and
      a light receiver configured to receive light emitted from the light emitter, and
   wherein the detector determines the light transmitting portions when the light receiver receives the light transmitted through the light transmitting portion, and determines that the reading target is the carrier sheet based on at least one of dimensions on upstream ends of the plurality of light transmitting portions in the transport direction and dimensions on downstream ends of the plurality of light transmitting portions in the transport direction.

6. An image reading method in an image reading apparatus which includes a conveyer configured to transport a reading target, and a reader configured to read an image of the reading target transported by the conveyer, the reading target including a carrier sheet that includes two transparent sheet portions and a bonding portion which bonds the sheet portions to each other, the method comprising:
   transporting the carrier sheet in a state in which the bonding portion is located on a downstream side in a transport direction; and
   starting reading in which the reader is caused to start reading, after an upstream end of the bonding portion passes through the reader, with the upstream end of the bonding portion being spaced away from a downstream edge of the carrier sheet in the transport direction.

* * * * *